A. P. BALDWIN.
Police Nippers.
No. 152,822.
Patented July 7, 1874.
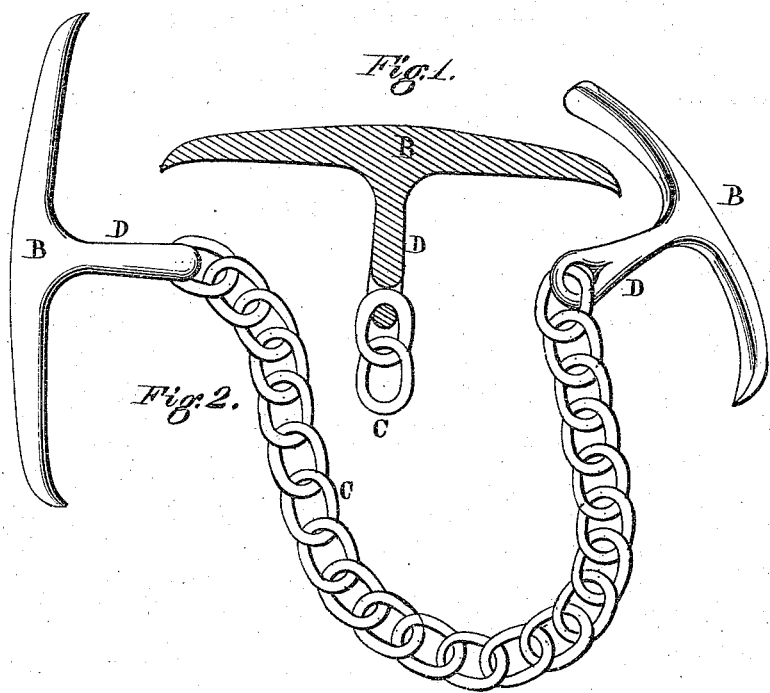
Witnesses:
Theodor E. Bent
Xaver Tahle
Inventor:
A. P. Baldwin

UNITED STATES PATENT OFFICE.

ALEXANDER P. BALDWIN, OF NEWARK, NEW JERSEY.

IMPROVEMENT IN POLICE-NIPPERS.

Specification forming part of Letters Patent No. 152,822, dated July 7, 1874; application filed February 3, 1874.

*To all whom it may concern:*

Be it known that I, ALEXANDER P. BALDWIN, of the city of Newark, county of Essex and State of New Jersey, have invented a Hand Part for Police-Nippers; and I do hereby declare that the following is a full and exact description thereof, reference being had to the accompanying drawing and the letters of reference marked thereon.

My invention consists in constructing the cross-bar with a short bar extending at right angles therefrom, and attaching the chain to the end of this short bar, instead of connecting it directly to the cross-bar, as hereinafter more fully described.

Figure 1 represents a longitudinal section of one of my improved bars, and Fig. 2 represents the nippers complete with my improvement applied.

In constructing police-nippers, it is customary to take a small chain of suitable length, and attach to each end of it a cross-bar, similar to those used on chain halters and trace-chains. When nippers thus made are used the links of the chain are brought between the fingers of the policeman, and tend to hurt the fingers more or less, thus preventing his keeping as firm a hold as is necessary; and this is increased when it becomes necessary to twist the chain, as is generally the case, more or less, in order to adapt the nippers to prisoners having small hands or wrists. To obviate this difficulty, and produce a more perfect implement, I construct the nippers as shown in the drawings. As there shown, I make the cross-bar B of the usual form; but, instead of forming an eye at its center for attaching the chain C, I form it with a short bar, D, projecting at right angles from its inner side, and connect the chain to the end of this cross-bar D, as shown in the drawings.

It will be seen that with this improvement the liability of injuring the hand or fingers of the officer is obviated, as in using it the smooth straight bars D are brought between the fingers when grasping the cross-bar B, as is the custom in using them; and if it be necessary to twist the chain, the twisting must necessarily take place beyond the ends of the bars D, thus leaving the latter straight and smooth between the fingers. By this means the officer is enabled to hold his prisoner with greater security, and with less liability of injury to himself.

What I claim as my invention is—

The police-nippers having the central bar D applied to the cross-bar B, substantially as and for the purpose described.

A. P. BALDWIN.

Witnesses:
    THEODORE E. BURT,
    XAVIER TAHLE.